US009338231B2

(12) United States Patent
Abramov et al.

(10) Patent No.: US 9,338,231 B2
(45) Date of Patent: May 10, 2016

(54) METHODS AND SYSTEMS FOR RECOMMENDING COMMUNICATIONS CONFIGURATIONS

(71) Applicants: SLING MEDIA INC., Foster City, CA (US); SLING MEDIA PVT LTD, Bangalore (IN)

(72) Inventors: Andrey L. Abramov, Foster City, CA (US); Yohann Georges, San Francisco, CA (US); Sachin D. Mule, Bangalore (IN)

(73) Assignees: Sling Media, Inc, Foster City, CA (US); Sling Media PVT Ltd, Bangalore (IN)

( * ) Notice: Subject to any disclaimer, the term of this patent is extended or adjusted under 35 U.S.C. 154(b) by 239 days.

(21) Appl. No.: 14/217,881

(22) Filed: Mar. 18, 2014

(65) Prior Publication Data

US 2015/0271257 A1   Sep. 24, 2015

(51) Int. Cl.

| | |
|---|---|
| *H04L 29/08* | (2006.01) |
| *H04L 29/06* | (2006.01) |
| *H04N 21/41* | (2011.01) |
| *H04N 21/436* | (2011.01) |
| *H04N 21/63* | (2011.01) |
| *H04L 12/24* | (2006.01) |
| *G06F 15/16* | (2006.01) |
| *H04N 21/258* | (2011.01) |

(Continued)

(52) U.S. Cl.
CPC .......... *H04L 67/104* (2013.01); *H04L 41/0803* (2013.01); *H04L 65/1069* (2013.01); *H04L 67/148* (2013.01); *H04L 67/34* (2013.01); *H04N 21/4122* (2013.01); *H04N 21/4135* (2013.01); *H04N 21/43615* (2013.01); *H04N 21/632* (2013.01); *H04N 21/25833* (2013.01); *H04N 21/6332* (2013.01); *H04N 21/6547* (2013.01)

(58) Field of Classification Search
CPC ............ H04L 41/0803; H04L 65/1069; H04L 67/104; H04L 67/148; H04L 67/34; H04N 21/25833; H04N 21/4122; H04N 21/4135; H04N 21/43615; H04N 21/632; H04N 21/6332; H04N 21/6547
USPC ......... 709/213, 220–222, 227–229, 231, 232, 709/248
See application file for complete search history.

(56) References Cited

U.S. PATENT DOCUMENTS 8,468,567 B2 * 6/2013 Craib ................. H04N 7/17318
725/25
2003/0079057 A1    4/2003 Ruskin et al.
(Continued)

OTHER PUBLICATIONS

Brandon C, "Slingbox 500 Setup Steps and Review," Oct. 26, 2012, pp. 1-18.*

(Continued)

*Primary Examiner* — Alina N Boutah
(74) *Attorney, Agent, or Firm* — Ingrassia Fisher & Lorenz, P.C.

(57) ABSTRACT

Methods, systems and devices are provided for placeshifting data. An exemplary method of placeshifting a media program from a first device to a second device involves receiving, by a server on a network, from the second device, a request for a placeshifting session over the network with the first device, identifying, by the server, recommended communications configuration information for the placeshifting session, and providing, by the server, the recommended communications configuration information to one of the second device and the first device in response to the request.

17 Claims, 4 Drawing Sheets

Figure 1:
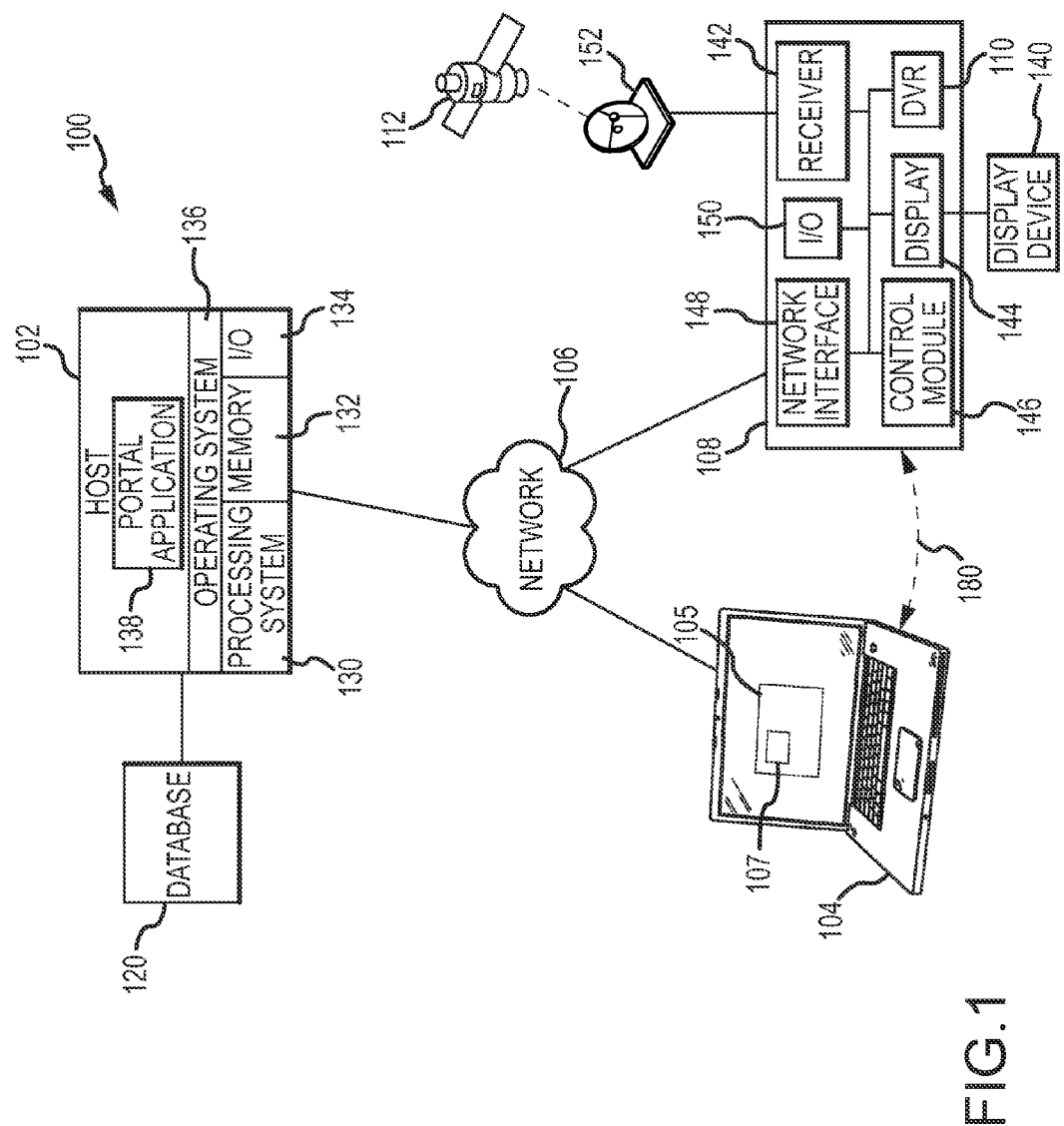

(51) Int. Cl.
H04N 21/6332 (2011.01)
H04N 21/6547 (2011.01)

(56) References Cited

U.S. PATENT DOCUMENTS

| | | | | |
|---|---|---|---|---|
| 2007/0198532 | A1* | 8/2007 | Krikorian | G06Q 30/0273 705/14.69 |
| 2009/0164600 | A1* | 6/2009 | Issa | H04L 67/325 709/215 |
| 2010/0005483 | A1* | 1/2010 | Rao | H04N 7/17318 725/25 |
| 2010/0060549 | A1 | 3/2010 | Tsern | |
| 2010/0082567 | A1* | 4/2010 | Rosenblatt | G06F 17/30017 707/705 |
| 2010/0268832 | A1* | 10/2010 | Lucas | H04L 69/18 709/228 |
| 2010/0306773 | A1* | 12/2010 | Lee | G06F 9/5077 718/1 |
| 2011/0035741 | A1* | 2/2011 | Thiyagarajan | G06F 8/65 717/170 |
| 2011/0055864 | A1* | 3/2011 | Shah | H04N 7/1675 725/31 |
| 2011/0138010 | A1* | 6/2011 | Rehiman | H04N 21/44213 709/217 |
| 2011/0138064 | A1* | 6/2011 | Rieger | G06F 17/30905 709/228 |
| 2011/0150432 | A1* | 6/2011 | Paul | H04L 65/4084 386/297 |
| 2011/0153845 | A1* | 6/2011 | Rao | H04L 12/44 709/228 |
| 2011/0191456 | A1* | 8/2011 | Jain | H04L 69/24 709/223 |
| 2011/0196521 | A1* | 8/2011 | Jain | H04L 12/281 700/94 |
| 2011/0208506 | A1* | 8/2011 | Gurzhi | G06F 9/45537 703/27 |
| 2012/0047532 | A1* | 2/2012 | McCarthy, III | H04N 5/44543 725/39 |
| 2012/0124170 | A1* | 5/2012 | Satheesh | H04L 65/605 709/219 |
| 2012/0131625 | A1* | 5/2012 | Satheesh | H04N 21/4312 725/109 |
| 2012/0131627 | A1* | 5/2012 | Chittella | H04N 21/2381 725/109 |
| 2012/0167142 | A1* | 6/2012 | Hey | H04N 5/76 725/44 |
| 2012/0222071 | A1* | 8/2012 | Gaede | H04N 5/765 725/38 |
| 2012/0278728 | A1* | 11/2012 | Malin | H04N 21/47202 715/748 |
| 2012/0278837 | A1* | 11/2012 | Curtis | H04N 21/8126 725/42 |
| 2012/0278844 | A1* | 11/2012 | Curtis | H04N 21/4147 725/93 |
| 2012/0284738 | A1* | 11/2012 | Narasimhan | H04H 20/38 725/16 |
| 2013/0117442 | A1* | 5/2013 | Mountain | H04N 21/45 709/224 |
| 2013/0219449 | A1* | 8/2013 | Muvavarirwa | H04N 21/43615 725/139 |
| 2013/0298154 | A1* | 11/2013 | Panigrahi | H04L 65/4084 725/28 |
| 2014/0281006 | A1* | 9/2014 | Major | H04L 65/60 709/231 |
| 2014/0359140 | A1* | 12/2014 | Shankarraman | H04L 65/1069 709/227 |
| 2015/0181484 | A1* | 6/2015 | Bruhn | H04W 36/06 370/329 |

OTHER PUBLICATIONS

Mule, Sachin D. et al., Methods and Apparatus for Managing Configuration Settings, U.S. Appl. No. 14/053,852, filed Oct. 15, 2013.
Wikipedia, Differentiated Services, dated Mar. 12, 2014; retrieved from the Internet at http://en.wikipedia.org/wiki/Diffserv on Mar. 18, 2014.
Wikipedia, Interactive Connectivity Establishment, dated Jan. 31, 2014; retrieved from the Internet at http://en.wikipedia.org/wiki/Interactive_Connectivity_Establishment on Mar. 18, 2014.
Wikipedia, Path MTU Discovery, dated Oct. 1, 2013; retrieved from the Internet at http://en.wikipedia.org/wiki/Path_MTU_Discovery on Mar. 18, 2014.
Wikipedia, Stun, dated Mar. 1, 2014; retrieved from the Internet at http://en.wikipedia.org/wiki/STUN on Mar. 18, 2014.
Wikipedia, Traversal Using Relays around NAT, dated Mar. 9, 2014; retrieved from the Internet at http://en.wikipedia.org/wiki/Traversal_Using_Relays_around_NAT on Mar. 18, 2014.
Fasbender et al., Virtually at Home: High-Performance Access to Personal Media, May 7, 2008, pp. 58-63, XP002569032, ISSN: 0014-0171.
International Search Report and Written Opinion, issued in International Application No. PCT/US2015/021085, dated Jun. 8, 2015.

* cited by examiner

METHODS AND SYSTEMS FOR RECOMMENDING COMMUNICATIONS CONFIGURATIONS

TECHNICAL FIELD

The following description generally relates to facilitating communications sessions for transmitting data between different devices.

BACKGROUND

Media content can now be received from any number of different sources and stored in a personal or digital video recorder (DVR) or the like for viewing at a later time ("time shifting"). Live or recorded media content can also be "place-shifted" to allow viewing at remote locations away from the viewer's primary television set. Due to the proliferation of portable consumer electronic devices with display and network communication capabilities, viewers have more opportunities to placeshift content. However, communications between devices can potentially be impacted by the functionality and/or performance of any number intermediary networking devices, such as, for example, routers, servers, firewalls, and the like, in addition to the physical layer(s) between the devices. That said, consumer expectations continually increase over time based on their perception of the current state of technological advances. Accordingly, it is now desirable to create systems and methods for placeshifting media content in an expeditious manner and providing a more satisfactory user experience. Other desirable features and characteristics may also become apparent from the subsequent detailed description and the appended claims, taken in conjunction with the accompanying drawings and this background section.

BRIEF SUMMARY

According to various exemplary embodiments, systems, devices and methods are provided for placeshifting a media program from a source device to a destination device. One exemplary method involves receiving, by a server on a network, from the destination device, a request for a placeshifting session over the network with the source device. The method further involves identifying, by the server, recommended communications configuration information for the placeshifting session, and providing, by the server, the recommended communications configuration information to one of the destination device and the source device in response to the request.

In other embodiments, a placeshifting system is provided. The system includes a media device coupled to a network to stream a media program over the network to a client device and a server coupled to the network to receive a request for a placeshifting session with the media device from the client device. The server is configured to identify recommended communications configuration information for the placeshifting session and provide the recommended communications configuration information to one of the client device and the media device in response to the request. One of the client device and the media device initiates a peer-to-peer connection over the network with the other of the client device and the media device using the recommended communications configuration information, and the media device streams the media program to the client device via the peer-to-peer connection.

In another embodiment, an exemplary media device includes a network interface configured to support communications via a network and a control module coupled to the network interface. The control module and the network interface are cooperatively configured to test a plurality of possible communications configuration settings for the network interface, receive a streaming request including a recommended communications configuration setting identified from among the plurality of possible communications configuration settings based on the testing, and establish a peer-to-peer connection with a client device over the network using the recommended communications configuration setting.

Various embodiments, aspects and other features are described in more detail below.

BRIEF DESCRIPTION OF THE DRAWING FIGURES

Figure 2:
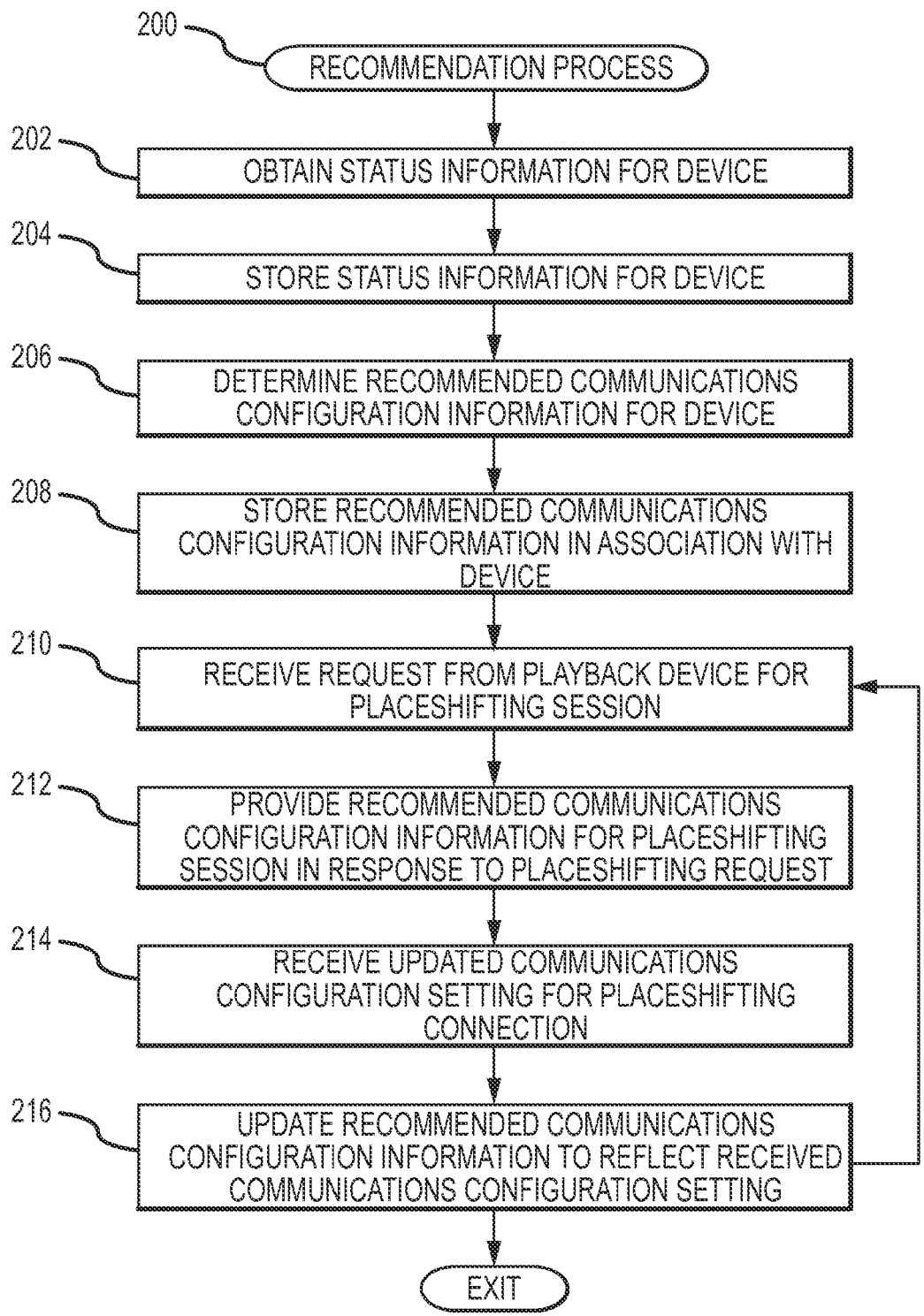
Figure 3:
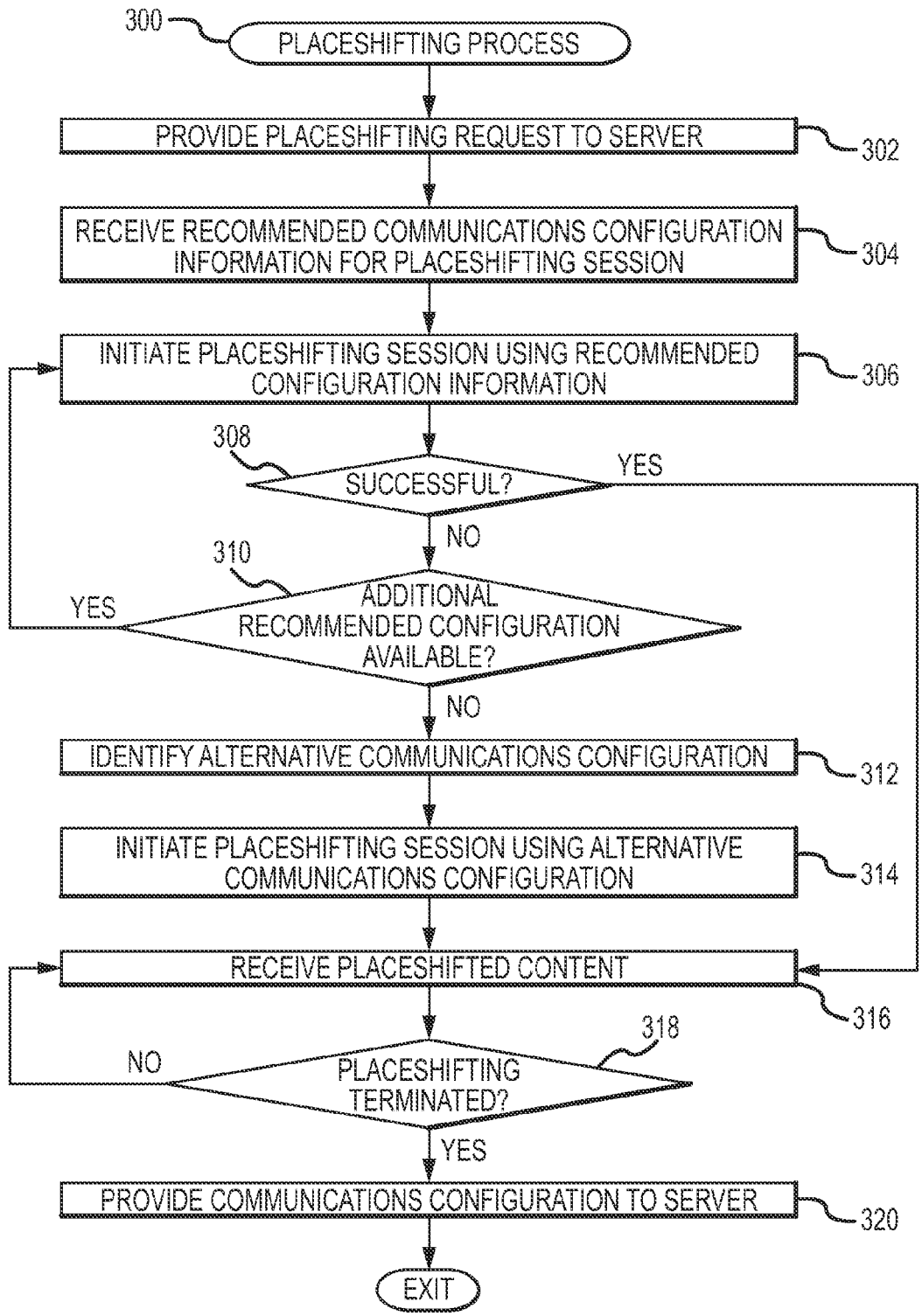
Figure 4:
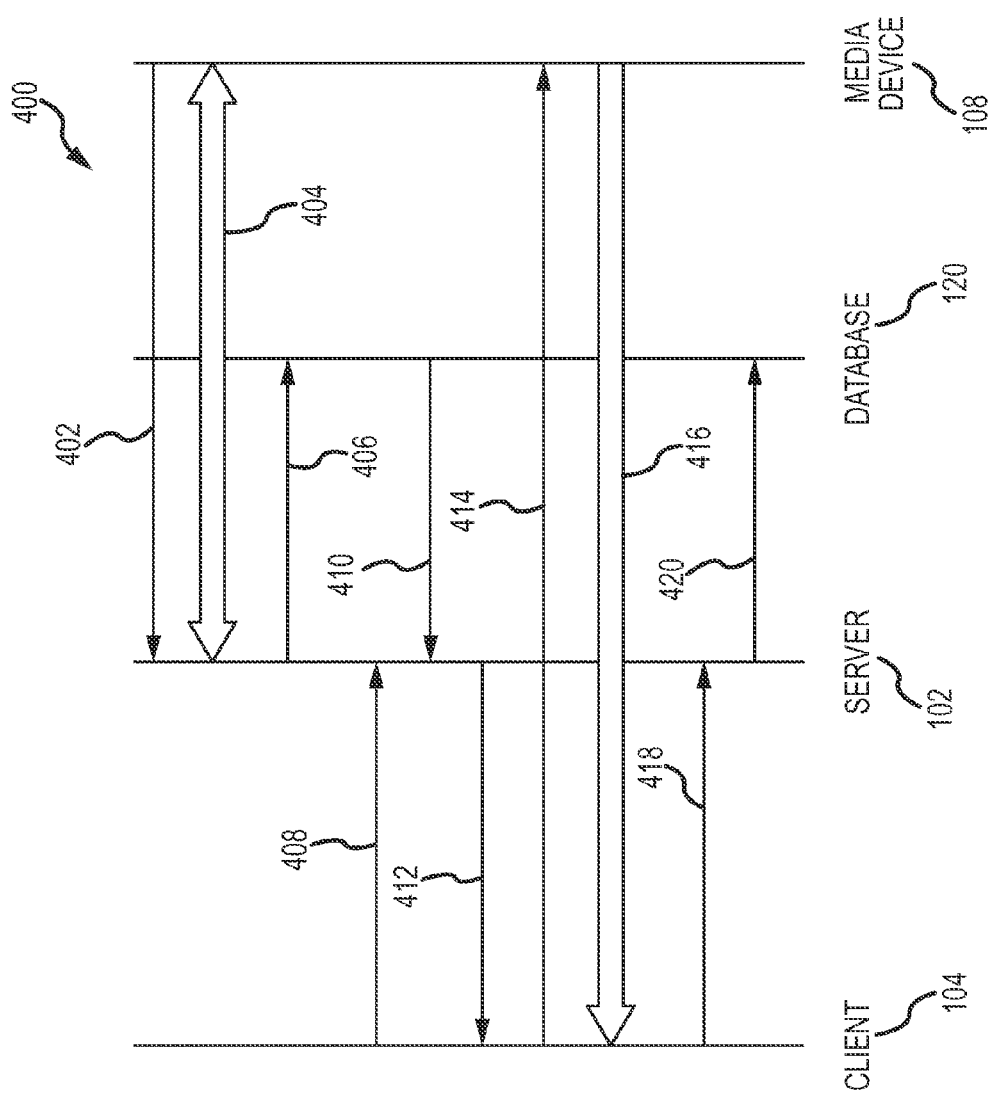

Exemplary embodiments will hereinafter be described in conjunction with the following drawing figures, wherein like numerals denote like elements, and FIG. 1 is a block diagram of a placeshifting system in accordance with one or more embodiments;

FIG. 2 is a flowchart of an exemplary recommendation process suitable for use with the placeshifting system of FIG. 1 in accordance with one or more embodiments;

FIG. 3 is a flowchart of an exemplary placeshifting process suitable for use in conjunction with the recommendation process of FIG. 2 in the placeshifting system of FIG. 1 in accordance with one or more embodiments; and FIG. 4 is a diagram illustrating a sequence of communications within the placeshifting system of FIG. 1 in accordance with one exemplary embodiment of the recommendation process of FIG. 2 in conjunction with the placeshifting process of FIG. 3.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to facilitating a placeshifting session by providing recommended communications configuration information that is likely to successfully establish a peer-to-peer communications for the placeshifting session in response to a placeshifting request. For purpose of explanation but without limitation, the subject matter may be described herein in the context of placeshifting media content among networked devices within a media system. However, it will be appreciated that the subject matter described herein is not necessarily limited to any particular type of content for the data being placeshifted. As used herein, "media content," "media program," or variants thereof should be understood as referring to any audio, video, audio/visual or other programming in any streaming, file-based or other format.

As described in greater detail below, in exemplary embodiments, the recommended communications configuration information includes one or more communications configuration settings that have previously been identified or otherwise determined as being likely to successfully establish a peer-to-peer connection over a network with at least one of the placeshifting device that will transfer content and the playback device requesting the placeshifted content. In exemplary embodiments, a recommended communications configuration setting identifies or otherwise includes one or more of the following: one or more addresses or identifiers associated with a physical communications layer and/or network interface of the placeshifting device and/or the playback device to be utilized for the peer-to-peer connection (e.g., Ethernet, WiFi, 4G, or the like), a communications protocol to be utilized for the peer-to-peer connection (e.g., transport control protocol (TCP), user datagram protocol (UDP), or the like), and/or one or more values for one or more parameters associated with that communications protocol (e.g., a packet size, a data rate, or the like).

In one or more exemplary embodiments, a server identifies or otherwise determines recommended communications configuration information for a placeshifting device and stores or otherwise maintains that recommended communications configuration information in association with the placeshifting device in a database. In response to receiving a placeshifting request associated with the placeshifting device from a requesting playback device, the server accesses the database to obtain the recommended communications configuration information associated with the placeshifting device and transmits or otherwise provides that recommended communications configuration information to either of the playback device or the placeshifting device. Thereafter, the recommended communications configuration information is utilized when initiating a peer-to-peer connection over a network between the playback device and the placeshifting device. Once a peer-to-peer connection is established, the placeshifting device streams the media program associated with the placeshifting request to the playback device over the network via the peer-to-peer connection.

As described in greater detail below, in some embodiments, the recommended communications configuration information provided by the server may be unsuccessful at establishing a peer-to-peer connection, or even if successful, the communications configuration settings may need to be modified or otherwise adjusted to maintain the peer-to-peer connection while streaming the media program during the placeshifting session. Accordingly, in such instances, the server may receive an updated communications configuration setting that was successful at establishing and/or maintaining the peer-to-peer connection from one of the playback device and the placeshifting device. In response, the server may store or otherwise maintain the updated communications configuration setting in the database and modify or otherwise update the recommended communications configuration information associated with the placeshifting device in a manner that reflects or is otherwise influenced by the received updated communications configuration setting. Thereafter, in response to a subsequent placeshifting request associated with the placeshifting device, the server accesses the database to obtain the updated recommended communications configuration information associated with the placeshifting device and transmits or otherwise provides that recommended communications configuration information to either of the requesting device or the placeshifting device. By virtue of the updated recommended communications configuration information including or otherwise being influenced by a communications configuration setting that was previously successful at establishing and/or maintaining a peer-to-peer connection with the placeshifting device, the likelihood of the subsequent placeshifting session being successfully established may be improved when using the updated recommended communications configuration information. In this manner, peer-to-peer placeshifting communications sessions may be created or otherwise established with a higher likelihood of success and/or reliability and/or with reduced latencies that would otherwise be associated with negotiating or discovering the appropriate communications configuration setting.

For purposes of explanation, the subject matter may be described in context of the recommended communications configuration information as being determined for the placeshifting device, however, it should be appreciated that in alternative embodiments, the recommended communications configuration information may also be determined for the playback device in an equivalent manner. In this regard, in some embodiments, when recommended communications configuration information exists for both the placeshifting device and the playback device, in some embodiments, the server may compare or otherwise analyze the recommended communications configuration information for the respective devices to identify commonly recommended communications configuration information that may be utilized as recommended communications configuration information for the placeshifting session between the particular placeshifting device and the playback device. Additionally, while the subject matter may be described in the context of the server responding to a placeshifting request by providing the recommended communications configuration information to the requesting playback device for initiating a peer-to-peer connection with the placeshifting device, in alternative embodiments, the server may respond to the placeshifting request by providing the recommended communications configuration information to the placeshifting device for initiating the peer-to-peer connection with the playback device.

FIG. 1 depicts an exemplary embodiment of a system 100 for placeshifting or otherwise transferring data or content, such as a media program (or media content), over a network 106 from a source electronic device 108 to a destination electronic device 104 presentation to a user (or viewer) on the destination electronic device 104. For purposes of explanation, but without limitation, the source device 108 may be alternatively referred to herein as a media device or a placeshifting device, and the destination electronic device 104 may be alternatively referred to herein as a playback device or a client device (or client). The system 100 also includes a host server 102 (or host) that communicates or otherwise interacts with the devices 104, 108 over the network 106 to provide recommended communications configuration information that facilitates establishment of a peer-to-peer connection 180 over the network 106 that is utilized for a placeshifting session, as described in greater detail below.

The client device 104 may be any device, component, module, hardware and/or the like that is capable of communicating with the server 102 over network 106. For example, depending on the embodiment, client device 104 may be realized as a conventional personal computer, portable computer, workstation and/or other computing system, a mobile (or cellular) telephone, a personal digital assistant, a video game player, a network appliance, a remote control, a networked display and/or any other device capable of receiving media programs via the network 106 and rendering audio and/or visual content. The client device 104 may include a processing system and a data storage element (or memory) that is coupled to or otherwise accessed by the processing system and stores programming instructions that, when read and executed, cause the processing system of the client device 104 to perform various tasks, functions, processes and/or operations and support the subject matter described herein. In practice, the client 104 may reside at a geographic location that is remote or otherwise physically distinct from the geographic location of the media device 108. In this regard, the media device 108 may have an essentially fixed or permanent geographic location, whereas the geographic location of the client 104 is transient or otherwise variable with respect to the location of the media device 108. For example, the media device 108 may be realized as a set-top box or a similar device that resides at a user's home for providing media content to the user's television or other home display device 140, while the client 104 is realized as a portable electronic device, such as a mobile phone or other mobile computing device, that moves about with the user.

In the embodiment shown in FIG. 1, client device 104 executes any sort of conventional browser or other client application 105 that is compatible with standard Internet, world wide web (WWW), transmission control protocol and/or internet protocol (TCP/IP), and/or other formats. Such browsers 105 are typically capable of displaying active or other documents formatted in accordance with published protocols (e.g., hypertext markup language (HTML), extensible markup language (XML), and/or the like). Many browsers 105 are also capable of executing "plugin" applications, applets or the like. Such plugins may be formatted in accordance with ActiveX, JAVA and/or any number of other formats. A number of commonly used web browsers are available for a number of different computing platforms, and the subject matter described herein is not limited to any particular browser application.

In exemplary embodiments, client 104 further includes a media player application 107. This media player 107 may be a standalone player, or the media player 107 may be implemented as a plugin or other applet that runs within browser 105 as desired. In some embodiments, media player 107 is initially obtained from a networked host, such as server 102. The media player 107 may be retrieved on an as-needed basis in some embodiments, or may be stored at client 104 for subsequent execution. Some embodiments may not provide media viewing directly on client 104; such clients 104 may nevertheless be able to interact with server 102 to search for particular programming, to select programs to record, to change preferences, or to take other actions related to media device 108 as desired.

Still referring to FIG. 1, in exemplary embodiments, the media device 108 is any device, module, component, hardware and/or the like capable of receiving and processing media content from one or more content sources. For example, in some embodiments, media device 108 is a set-top box (STB) or similar system that is able to receive television programming and/or to record certain programs that can be viewed on a display device 140, such as a television, monitor, liquid crystal display (LCD), light emitting diode (LED) display, plasma display, or the like. Exemplary embodiments of media device 108 will therefore include a receiver interface 142 for receiving satellite, cable and/or broadcast programming signals from broadcast sources 112, as well as a data storage medium 110 (e.g., a hard disk, flash memory, or another suitable non-volatile data storage element) to support a digital video recorder (DVR) feature and/or functionality, a display interface 144 for providing imagery to the display device 140, and a control module 146 that directs the operations of the media device 108 as appropriate. For convenience, but without limitation, the data storage medium 110 is alternatively referred to herein as a DVR. Media device 108 may also include one or more interfaces 148 to the network 106 and/or an input/output interface 150 to a remote control or other device for providing user inputs to the media device 108, as appropriate. For example, as described in greater detail below, the network interface(s) 148 of the media device 108 may include an interface or port for a wired communications layer (e.g., an Ethernet port or adapter), an interface for a wireless communications layer (e.g., an IEEE 802.11-compatible transceiver), and/or the like.

The components in media device 108 may be provided within a common chassis or housing as shown in FIG. 1, although equivalent embodiments may implement media device 108 with any number of inter-connected but discrete components or systems. For example, in some embodiments, the media device 108 may be realized as a combination of a STB and a placeshifting device, wherein some features of the media device 108 (e.g., the DVR 110, the receiver 142, the display interface 144, and/or I/Os 150) are implemented by the STB and other features of the media device 108 (e.g., the network interface 148) are implemented by the placeshifting device, wherein the placeshifting device works in conjunction with the STB to shift the viewing experience from a home television (e.g., display device 140) to a viewing display on the client device 104 (e.g., media player application 107) that is accessed via the network 106. Examples of placeshifting devices that may be used in some embodiments of media device 108 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 108 may be a hybrid DVR and/or receiver, for example, that also provides transcoding and placeshifting features. It should be appreciated that FIG. 1 depicts merely one exemplary embodiment of a media device 108, and in practice, the media device 108 may be logically and physically implemented in any manner to suit the needs of a particular embodiment.

In the exemplary embodiment illustrated in FIG. 1, media device 108 is capable of receiving digital broadcast satellite (DBS) signals transmitted from a broadcast source 112, such as a satellite, using an antenna 152 that provides received signals to the receiver 142. Equivalent embodiments, however, could receive programming at receiver 142 from any sort of cable connection, broadcast source, removable media, network service, external device and/or the like. The DVR 110 feature stores recorded programming (e.g., broadcast programming received via receiver 142) on a hard disk drive, memory, a networked server, or other storage medium as appropriate in response to user/viewer programming instructions, wherein the recorded programming may be subsequently viewed on display device 140 or client device 104 via network 106. Content stored in DVR 110 may be any sort of file-based programming or other content that is accessible to media device 108. In various embodiments, in addition to storing broadcast programming, the DVR 110 may also store programming received from other sources not illustrated in FIG. 1, such as, for example, programming downloaded from an on-demand programming source or an online programming source. Additionally, content in DVR 110 may be stored in any sort of compressed or uncompressed format, as desired, and may be encoded or transcoded as desired for effective receipt, storage, retrieval and playing.

The control module 146 is any sort of hardware, circuitry, processing logic and/or other components capable of directing the operations of media device 108. In various embodiments, control module 146 includes software or firmware logic and/or other programming instructions residing in memory and executing on any sort of processing system, such as any sort of processor, microprocessor, microcontroller, digital signal processor or the like. The instructions, when read and executed, cause the control module 146 to perform various tasks, functions, processes and/or operations and otherwise support the subject matter described herein. In various embodiments, the control module 146 is based upon a "system on a chip" (SoC) implementation that incorporates a hybrid microcontroller with memory, input/output and other features to perform the various signal processing and other actions of media device 108. Other embodiments may implement control module 146 and/or the other features of media device 108 with any number of discrete and/or integrated processing components (e.g., any sort of microprocessor or microcontroller), memories, input/output features and/or other features as desired. The control module 146 communicates with the network interface 148 to establish a connection 180 to the client device 104 over the network 106 and support streaming of media programs (e.g., from the DVR 110 or the receiver 142) to the client device 104 over the network 106 via the connection 180, as described in greater detail below.

In the illustrated embodiment of FIG. 1, the server 102 may be realized as one or more server computers or another device capable of interacting with the devices 104, 108 to facilitate communications between the client device 104 and the media device 108 associated with the user or operator of the client 104. The server 102 may be implemented with a server computer system or data processing system that is based upon any processor, architecture and/or operating system, and will typically be implemented using any sort of conventional processing system 130, memory 132 and input/output features 134. Various embodiments may be implemented using dedicated or shared hardware servers; other implementations may make use of virtual server features as part of a "cloud computing" service, such as any of the cloud computing services provided by any number of providers. Although FIG. 1 shows a single server 102 for convenience, many practical embodiments of the system 100 may provide a cluster or other collection of multiple host servers 102 to support any desired number of simultaneous communications with multiple clients 104 and/or multiple media devices 108. This cluster may also incorporate appropriate routing, load balancing, access and security mechanisms and or any number of other features. In various embodiments, each server 102 is an actual or virtual computer system executing an operating system 136 in conjunction with the processing system 130, memory 132 and/or I/O features 134 to provide a computing core that is capable of executing a portal application 138, as well as any number of daemons, processes, applications or other instance modules as desired. For example, a portal application 138 could execute as a daemon on the server 102, with connections to separate clients 104 being managed as separate processes or instances that communicate with portal application 138 using features provided by operating system 136. In one or more embodiments, the memory 132 stores programming instructions that, when read and executed, cause the processing system 130 to create, generate, or otherwise facilitate the portal application 138 and perform various tasks, functions, processes and/or operations described herein.

In the embodiment of FIG. 1, the network 106 is any digital or other communications network capable of transmitting data between devices. In various embodiments, network 106 includes any number of public or private data connections, links or networks supporting any number of communications protocols. Network 106 may include the Internet, for example, or any other network. Such networks may be based upon TCP/IP or other conventional protocols, although other embodiments may use any type of alternate or successor protocols, as desired. In various embodiments, network 106 may also incorporate a wireless and/or wired telephone network, such as a cellular communications network for communicating with mobile phones, personal digital assistants, and/or the like. Various embodiments of network 106 may also incorporate any sort of wireless or wired local area networks (LANs), wide area networks (WAN), or the like.

Although not illustrated in FIG. 1, in practice, any number of intermediary networking devices may reside between one of the devices 104, 108 and the network 106 or the other of the devices 104, 108. For example, the media device 108 may reside on the network 106 behind a firewall or router device that can potentially restrict communications to/from the media device 108. Additionally, the physical communications layer between one of the devices 104, 108 and the network 106 may be different from the physical communications layer between the other of the devices 104, 108 and the network 106. For example, the client device 104 may be communicatively coupled to the network 106 via a wireless communications layer having a lower throughput than a wired communications layer that communicatively couples the media device 108 to the network 106. As described in greater detail below, in exemplary embodiments, the server 102 identifies or otherwise determines recommended communications configuration information for establishing the connection 180 between the devices 104, 108 over the network 106. In this regard, the recommended communications configuration information is intended to account for the potential impact of any intermediary networking devices between the devices 104, 108 on the network 106 and the potential impact of the physical communications layer(s) between the devices 104, 108 and the network 106 to facilitate reliably establishing the connection 180 between the devices 104, 108 in an expedient manner. In exemplary embodiments, the server 102 is coupled to a database 120 that stores or otherwise maintains an association between the media device 108 and/or the client device 104 and the recommended communications configuration information for that media device 108 and/or the client device 104.

In one or more exemplary embodiments, the client device 104 transmits or otherwise provides, to the server 102 via the network 106, a request to placeshift media content from the media device 108 to the client device 104. For example, the user may direct the client application 105 to a URL or other address associated with the server 102 and/or the portal application 138 and interact with the client application 105 and/or the portal application 138 to submit or otherwise indicate a request to placeshift a media program. After the user is successfully authenticated by the portal application 138 and/or the server 102, the server 102 and/or the portal application 138 identifies the media device 108 associated with the user, obtains the recommended communications configuration information for the requested placeshifting session from the database 120, and provides recommended communications configuration information to at least one of the client device 104 and/or the media device 108 for initiating the peer-to-peer connection 180. Thereafter, the recommended communications configuration information is utilized by the client device 104 and/or the media device 108 to initiate establishment of the peer-to-peer connection 180 over the network 106. In this manner, when the recommended communications configuration information accounts for the performance characteristics and/or the potential impact of any intermediary networking devices and/or physical communications layer(s) between the devices 104, 108, a reliable peer-to-peer connection 180 between the devices 104, 108 over the network 106 may be established more expediently.

As described in greater detail below, in some embodiments, when attempts to establish the peer-to-peer connection 180 using the recommended communications configuration information are unsuccessful and/or the communications configuration information for the peer-to-peer connection 180 is adjusted during a placeshifting session (e.g., adaptive streaming), the client device 104 and/or the media device 108 may identify or otherwise determine alternative communications configuration information that is effective for establishing and/or maintaining the peer-to-peer connection 180. Thereafter, the alternative communications configuration information is communicated to the server 102 and/or the portal application 138, which, in turn, utilizes the alternative communications configuration information to augment or otherwise influence the recommended communications configuration information provided in response to subsequent placeshifting requests. In this regard, in exemplary embodiments, the server 102 updates the database 120 to store or otherwise maintain an association between the media device 108 and/or the client device 104 and the alternative communications configuration information that was received for that device 104, 108.

FIG. 2 depicts an exemplary embodiment of a recommendation process 200 suitable for implementation by a server in a placeshifting system, such as the server 102 in the system 100 of FIG. 1, to facilitate a placeshifting session between two devices over a network. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the recommendation process 200 may be performed by different elements of the system 100, such as, for example, the server 102, the client device 104, the media device 108, and/or the database 120. It should be appreciated that the recommendation process 200 may include any number of additional or alternative tasks, the tasks need not be performed in the illustrated order and/or the tasks may be performed concurrently, and/or the recommendation process 200 may be incorporated into a more comprehensive procedure or process having additional functionality not described in detail herein. Moreover, one or more of the tasks shown and described in the context of FIG. 2 could be omitted from a practical embodiment of the recommendation process 200 as long as the intended overall functionality remains intact.

In exemplary embodiments, the recommendation process 200 receives or otherwise obtains communications status information for a device that will be part of a placeshifting session and storing or otherwise maintaining the communications status information in association with the device (tasks 202, 204). For example, in accordance with one or more embodiments, the media device 108 automatically attempts to communicate with the server 102 upon being powered on and/or connected to the network 106 and provide data or information identifying the current communications status for the media device 108. In this regard, the current communications status information may include or otherwise identify the type and/or number of physical communications layers that the media device 108 is currently capable of communicating on, the network interface(s) 148 of the media device 108 that are currently capable of being utilized to communicate on those physical communications layers, the performance characteristics and/or parameters for those physical communications layer(s) and/or network interface(s) 148, and the like.

For example, upon the media device 108 being powered on and connected to the network 106, the media device 108 may automatically contact the server 102 via the network 106 and provide current communications status information to the server 102 that identifies that the media device 108 is coupled to the network 106 via an Ethernet cable and also via a wireless communications layer, a media access control (MAC) address, an Internet Protocol (IP) address, and/or another identifier associated with the Ethernet port receiving the Ethernet cable, the MAC address, IP address, and/or another identifier associated with the wireless transceiver coupled to the wireless communications layer, and the like. Additionally, the media device 108 may automatically provide information identifying the current bandwidth or data rate for the respective communications layers, the maximum bandwidth or data rate supported by the Ethernet port and/or the wireless transceiver, the signal strength for the wireless communications layer, the differentiated services (DiffServ) configuration for the media device 108, and/or other performance characteristics and/or parameters associated with communications between the media device 108 and the network 106.

After obtaining current communications status information for the media device 108, the server 102 may store or otherwise maintain the current communications status information for the media device 108 in the database 120 in association with the media device 108. For example, the server 102 may assign a unique identifier associated with the media device 108 to an entry (or row) in the database 120 that includes the current communications status information received for the media device 108. In a similar manner as described above in the context of the media device 108, in some embodiments, the server 102 may obtain current communications status information for the client device 104 and store the current communications status information associated with the client device 104 in the database 120. For example, the client device 104 may transmit or otherwise provide its current communications status information to the server 102 upon being powered on, restarted, and/or connected to the network 106.

In exemplary embodiments, the recommendation process 200 continues by identifying or otherwise determining recommended communications configuration information for communicating with the device and storing or otherwise maintaining the recommended communications configuration information in association with the device (tasks 206, 208). In one or more exemplary embodiments, the recommended communications configuration information is realized as an ordered list of communications configuration settings. In exemplary embodiments, each recommended communications configuration setting is realized as a combination of one or more of the following: a particular recommended physical communications layer and/or network interface 148, a recommended communications protocol for use with the recommended physical communications layer and/or network interface 148, and recommended communications protocol parameter values for use with the recommended communications protocol. In this regard, each combination of physical communications layer and/or network interface, communications protocol, and/or communications protocol parameters has been identified or otherwise determined as being likely to result in communications to/from a device being established with a desired level of success (e.g., a desired tradeoff between accuracy and/or reliability, throughput, and the like) during a subsequent placeshifting session. In this regard, the server 102 may store or otherwise maintain, in the database 120, the ordered list of recommended communications configurations for the media device 108 and/or the client device 104 in association with a unique identifier associated with the media device 108 and/or the client device 104. In some embodiments, the recommended communications configurations may include only a single recommended communications configuration setting.

In some embodiments, after obtaining communications status information for a device 104, 108, the server 102 automatically determines recommended communications configuration information for communicating with that device 104, 108 based on its associated communications status information. For example, based on the physical communications layer(s) the media device 108 is capable of communicating on, the performance characteristics and/or parameters for the physical communications layer(s), the performance characteristics and/or parameters for the network interface(s) 148 associated with those physical communications layer(s), and the like, the server 102 may identify or otherwise determine the communications configuration information that is most likely to be successful at establishing and supporting communications with the media device 108. In this regard, the server 102 may determine which physical communications layer is most likely to be successful when used to communicate with the media device 108 along with additional configuration information that is most likely to be successful based on the performance characteristics and/or parameters for that physical communications layer and/or its associated network interface 148. For example, the recommended communications configuration information determined by the server 102 may include the MAC address, the IP address, and/or another unique identifier associated with the recommended network interface 148 of the media device 108 along with the communications protocol (e.g., transmission control protocol (TCP), user datagram protocol (UDP), or the like) to be utilized to communicate with the media device 108 and various parameters thereof, such as, for example, a maximum transmission unit (MTU) or packet size, a maximum data rate or throughput, and the like.

In accordance with one or more embodiments, the server 102 determines the recommended communications configuration information for communicating with a device 104, 108 by automatically initiating a configuration information discovery (or test) procedure. For example, upon the media device 108 being powered on, the media device 108 may automatically contact the server 102 over the network to provide its current communications status information to the server 102 as part of a startup procedure for the media device 108. In response to the media device 108 contacting the server 102, the server 102 may utilize the current communications status information to automatically initiate a configuration information discovery procedure that exhaustively tests the different physical communications layer(s) and/or network interface(s) 148 associated with the media device 108 to identify which of the physical communications layer(s) and/or network interface(s) 148 is most likely to be successful (e.g., most likely to achieve the highest level of reliability, throughput, or the like) along with the communications protocol and related communications protocol parameters associated therewith that are most likely to be successful. In various embodiments, the configuration information discovery procedure may also be performed in response to a device 104, 108 or the server 102 receiving an input from a user (e.g., manual initiation) or in response to a failure to establish communications to/from a particular device 104, 108.

For example, for a respective physical communications layer and/or network interface 148 associated with the media device 108, the server 102 may transmit, to the media device 108, a request for the media device 108 to transmit test (or dummy) data back to the server 102 using a requested communications protocol with an initial MTU or packet size, an initial maximum data rate or throughput, and the like. Thereafter, the server 102 may receive the test data transmitted by the media device 108, calculate or otherwise determine a metric indicative of the relative success (e.g., the accuracy or reliability associated with the received test data, the received throughput for the test data, or the like) of that particular combination of communications protocol, communications protocol parameters, and physical communications layer and/or network interface 148, and store or otherwise maintain the success metric value in association with that particular combination of communications configuration information for that physical communications layer and/or network interface 148. Thereafter, the server 102 may vary the communications protocol parameters (e.g., by incrementally increasing and/or decreasing the requested MTU and/or data rate from the initial value(s)) for the particular combination of communications protocol and physical communications layer and/or network interface 148 until the server 102 as desired until the server 102 receives the test data with a desired level of accuracy and/or reliability or no longer receives the test data with a desired level of accuracy and/or reliability, and store the corresponding success metric values in association with that particular combination of communications configuration information for that physical communications layer and/or network interface 148.

After incrementally testing one combination of communications protocol and physical communications layer and/or network interface 148, the server 102 may repeat the configuration information discovery procedure for each possible combination of communications protocol and physical communications layer and/or network interface 148 and obtain success metric values associated with each particular combination of a communications protocol, the communications protocol parameters, and a particular physical communications layer and/or network interface 148. Based on the success metric values, the server 102 may determine or otherwise identify the recommended configuration information for the media device 108 as the combination(s) of communications protocol, communications protocol parameters, and physical communications layer and/or network interface 148 that achieves the relatively highest success metric value(s). For example, the server 102 may determine or otherwise identify that using TCP with a particular MTU and/or data rate to communicate with the media device 108 via Ethernet is more likely to be successful (e.g., achieve a desired reliability, accuracy and/or throughput) than using UDP with that same MTU and/or data rate to communicate with the media device 108 via Ethernet or using TCP with a different MTU and/or data rate to communicate with the media device 108 via a wireless communications layer, and thus, identify that combination of TCP, MTU and/or data rate, and Ethernet interface 148 as being the recommended communications configuration information for the media device 108 over those other communications configuration combinations.

In some embodiments, the server 102 may also identify or otherwise determine average success metric value for a particular communications configuration for a particular network address or a range thereof based on the success metric values for when that particular communications configuration used with multiple devices at that network address (or a range thereof). For example, multiple instances of the client device 104 may communicate with the server 102 via a hotspot, access point, or another network access device associated with a particular address (or range of addresses) on the network 106. Using the individual success metric values for the different individual instances of the client device 104 when using a particular communications configuration to communicate via that particular access point, the server 102 may calculate or otherwise determine an average success metric value for a particular communications configuration combination. For a particular network address (or range) associated with a hotspot, access point, or another network access device capable of supporting multiple instances of client devices 104, the server 102 may create an entry in the database 120 that maintains an association between that network address (or range), a particular communications configuration combination, and the average success metric value. Thereafter, the average success metric values associated with a particular communications configuration combination at a particular network address (or range) may influence the recommended communications configuration identified by the server 102 when an instance of the client device 104 that does not have stored recommended communications configuration information stored in the database 120 for that particular network address (or range) contacts the server 102 from that network address (or within the range). For example, the server 102 may identify that a particular communications configuration combination tends to work well for a certain type of device at a particular network address, and recommend that particular communications configuration combination to the client device 104 when the client device 104 initially contacts the server 102 from that particular network address in lieu of performing a configuration information discovery procedure.

Still referring to FIG. 2, the recommendation process 200 continues by receiving a request for establishing a placeshifting session with an identified device and transmitting or otherwise providing the recommended communications configuration information for that placeshifting session in response to the placeshifting request (tasks 210, 212). In exemplary embodiments, a user of the client device 104 manipulates the client application 105 to access the portal application 138 on the server 102 (e.g., by inputting a URL or another address on the network 106 for the server 102) and transmit, submit, or otherwise provide, to the server 102, a request to establish a placeshifting session with the user's associated media device 108 over the network 106. In response to receiving the placeshifting request, the server 102 utilizes the identifier associated with the media device 108 included in the placeshifting request (or otherwise associated with the authenticated user making the placeshifting request) to access the database 120 and obtain the recommended communications configuration information associated with the media device 108. Thereafter, the server 102 may transmit or otherwise provide the recommended communications configuration information for the media device 108 to the client device 104 for use by the client device 104 to initiate and establish the peer-to-peer connection 180 with the media device 108. Depending on the embodiment, the server 102 may provide an ordered list of recommended communications configuration settings for communicating with the media device 108 or only the recommended communications configuration settings associated with the media device 108 that are most likely to achieve a desired level of success. In alternative embodiments, the server 102 may respond to the placeshifting request by transmitting or otherwise providing the recommended communications configuration information to the media device 108 along with a streaming request that identifies the destination client device 104 for use by the media device 108 to initiate and establish the peer-to-peer connection 180 with the client device 104.

In some embodiments, if the database 120 maintains recommended communications configuration information for the requesting playback device 104 along with the requested placeshifting device 108, the server 102 may dynamically determine recommended communications configuration information for the placeshifting based on the recommended communications configuration information for the requesting playback device 104 and the recommended communications configuration information for the requested placeshifting device 108. In such embodiments, in response to receiving the placeshifting request, the server 102 utilizes the identifier associated with the client device 104 to access the database 120 and obtain the recommended communications configuration information associated with the client device 104. Thereafter, the server 102 may identify or otherwise determine recommended communications configuration information for the placeshifting session based on the recommended communications configuration information for both devices 104, 108, for example, by identifying the commonly recommended communications configuration information. For example, if the list of recommended communications configuration information maintained in the database 120 for the requesting client device 104 includes TCP with a first MTU and/or data rate as the most highly recommended communications configuration setting for the client device 104 along with UDP with another MTU and/or data rate as the next most highly recommended communications configuration setting for the client device 104, and the list of recommended communications configuration information maintained in the database 120 for the requested placeshifting device 108 includes UDP with a different MTU and/or data rate as the most highly recommended communications configuration setting for the media device 108, the server 102 may determine that the recommended communications protocol for the requested placeshifting session to be UDP based on UDP being a commonly recommended communications protocol for both devices 104, 108 involved in the placeshifting session. Additionally, the server 102 may identify the lesser of the recommended MTUs and/or data rates for using UDP with the devices 104, 108 for use as the recommended MTU and/or data rate for use with UDP during the placeshifting session.

In yet other embodiments, the server 102 may dynamically determine recommended communications configuration information for the placeshifting based on the placeshifting request. For example, the placeshifting request received by the server 102 from the client device 104 may include a request for particular communications configuration setting (e.g., a requested communications protocol, a requested MTU, a requested data rate, and/or the like). Based on the requested communications configuration information received from the client device 104, the server 102 may access the stored communications configuration information associated with the media device 108 to identify or otherwise determine the communications configuration settings for the media device 108 that are most likely to be successful (e.g., has the greatest success metric value) for that requested communications configuration. For example, if the client device 104 requests that TCP be used for the placeshifting session, the server 102 may identify, based on the associations between success metric values and corresponding communications configurations stored in the database 120 for the media device 108, the combination of communications parameter values (e.g., MTU and/or data rate) and physical communications layer and/or network interface 148 for using TCP with the media device 108 that has the greatest success metric value relative to using TCP with other combinations of communications parameter values and physical communications layer(s) and/or network interface(s) 148. As described above, the recommended communications configuration information identified by the server 102 in response to a placeshifting request may also be influenced by the recommended communications configuration information maintained by the database 120 in association with a particular network address (or range thereof) from which one of the devices 104, 108 is communicating (e.g., when the network address of the client 104 corresponds to a popular hotspot or access point via which one or more instances of client devices have previously communicated with the server 102).

In the illustrated embodiment, the recommendation process 200 continues by obtaining or otherwise receiving updated communications configuration information for the placeshifting session after previously providing recommended communications configuration information and updating the recommended communications configuration information to reflect the received communications configuration information (tasks 214, 216). In this manner, communications configuration settings that were previously successful in establishing and/or maintaining a peer-to-peer connection 180 between devices 104, 108 may influence or otherwise augment the recommended communications configuration settings that will be provided by the server 102 in response to a subsequent placeshifting request for use in establishing and/or maintaining a subsequent placeshifting session.

As described in greater detail below in the context of FIGS. 3-4, in exemplary embodiments, after the server 102 provides recommended communications configuration information in response to the placeshifting request, the devices 104, 108 attempt to establish a peer-to-peer connection 180 over the network 106 using that recommended communications configuration information and thereafter begin a placeshifting session. However, in some embodiments, the recommended communications configuration information may be unsuccessful at establishing the peer-to-peer connection 180, or the communications configuration settings for the peer-to-peer connection 180 may be adjusted or otherwise adapted in real-time or on-the-fly during the placeshifting session to maintain the peer-to-peer connection 180 in response to changes on the network 106, changes to a physical communications layer between one of the devices 104, 108 and the network 106, changes to a network interface of one of the devices 104, 108, or the like. In this regard, in exemplary embodiments, in response to the communications configuration settings for the peer-to-peer connection 180 being adjusted or otherwise modified relative to the initially recommended communications configuration settings provided by the server 102, one of the devices 104, 108 transmits or otherwise provides the updated communications configuration settings for the peer-to-peer connection 180 to the server 102.

Still referring to FIG. 2, in exemplary embodiments, in response to receiving updated communications configuration settings for a placeshifting session between devices 104, 108, the server 102 updates the recommended communications configuration settings for at least one of those devices 104, 108 to reflect the updated communications configuration settings. For example, the server 102 may receive updated communications configuration settings from the media device 108 and/or the client device 104 after the peer-to-peer connection 180 is terminated, and store the received communications configuration settings in the database 120 as recommended communications configuration settings for the media device 108 and/or the client device 104. In one or more embodiments, the server 102 may overwrite the previously recommended communications configuration setting associated with the media device 108 with the received updated communications configuration setting, thereby indicating that the received updated communications configuration setting is now the recommended communications configuration setting associated with the media device 108 for subsequent placeshifting requests.

In other embodiments, the server 102 may update the ordered list of recommended communications configuration settings associated with the media device 108 to include the received updated communications configuration setting. For example, the server 102 may insert or otherwise add the received updated communications configuration setting to the ordered list of recommended communications configuration settings such that the received updated communications configuration setting are ordered first in the list to reflect that they are the most highly recommended communications configuration setting based on their previous success at establishing and/or maintaining the peer-to-peer connection 180 with the media device 108. In this regard, other communications configuration settings in the ordered list of recommended communications configuration settings associated with the media device 108 may be downgraded in the ordered list to reflect that those settings are less highly recommended than the received updated communications configuration setting. In other embodiments, if the received updated communications configuration setting was already present in the ordered list of recommended communications configuration settings associated with the media device 108, the server 102 may move them up in the order so that they are more highly recommended relative to other communications configuration settings in the list based on their previous success at establishing and/or maintaining the peer-to-peer connection 180 with the media device 108. In a similar manner, an updated communications configuration setting may also be utilized to augment or otherwise influence the recommended communications configuration associated with the client device 104.

Still referring to FIG. 2, in exemplary embodiments, the loop defined by tasks 210, 212, 214 and 216 may repeat during operation of the system 100 until the recommendation process 200 is reinitialized (e.g., by the media device 108 being reset or otherwise experiencing changes in its connectivity to network 106). In this regard, in response to receiving a subsequent placeshifting request associated with the media device 108, the server 102 may automatically transmit or otherwise provide the updated communications configuration setting received for the media device 108 (e.g., task 214) as the recommended communications configuration setting for the subsequent placeshifting session. For example, after an initial placeshifting session between the client device 104 and the media device 108 is terminated, the media device 108 may transmit or otherwise provide the most recent communications configuration setting for the peer-to-peer connection 180 to the server 102, which, in turn, stores or otherwise maintains that communications configuration setting as the updated recommended communications configuration setting associated with the media device 108. Thereafter, the user of the client device 104 may manipulate the client application 105 to transmit, submit, or otherwise provide a request to establish another placeshifting session with the media device 108 over the network 106. In response to receiving the subsequent placeshifting request, the server 102 transmits or otherwise provides the received communications configuration setting for the previous peer-to-peer connection 180 as the recommended communications configuration setting for establishing a new placeshifting session with the media device 108. For example, in response to another placeshifting request from the client device 104, the server 102 may provide the communications configuration setting from a previous peer-to-peer connection 180 with the media device 108 to the client device 104 for use in establishing another peer-to-peer connection 180 with the media device 108. In other embodiments, the server 102 may utilize the updated communications configuration setting previously received from the media device 108 to dynamically determine recommended communications configuration information for the subsequent placeshifting session in a similar manner as described above. Thus, communications configuration settings that were successful in establishing and/or maintaining a previous peer-to-peer connection 180 with a device 104, 108 may influence the recommended communications configuration settings provided by the server 102 in response to a subsequent placeshifting request for use in establishing and/or maintaining a subsequent placeshifting session with that device 104, 108.

It should be noted that in some embodiments, the recommended communications configuration settings may not necessarily be limited to a particular combination of client device 104 and the media device 108. For example, an updated recommended communications configuration setting associated with the media device 108 that was determined while maintaining a peer-to-peer connection 180 between the media device 108 and a first instance of a client device 104 may be identified by the server 102 as a recommended communications configuration setting when a second instance of the client device 104 attempts to establish a subsequent peer-to-peer connection 180 with the media device 108. Additionally, as described above, recommended communications configuration information maintained by the database 120 in association with a particular network address (or range thereof) may also influence the recommended communications configuration information identified by the server 102 in response to a placeshifting request. In this manner, when a new instance of a client device 104 requests a placeshifting session with a media device 108 having associated recommended communications configuration information in the database 120 from an address on the network 106 having associated recommended communications configuration information in the database 120, the server 102 may utilize the recommended communications configuration information associated with the media device 108 and the network address to identify or otherwise determine recommended communications configuration information for the new instance of the client device 104. In this manner, a successful peer-to-peer connection may be more likely to be established with a new instance of the client device 104 with reduced latency and without having to perform an exhaustive discovery procedure for the new instance of the client device 104.

FIG. 3 depicts an exemplary embodiment of a placeshifting process 300 suitable for implementation by a device in a placeshifting system, such as one or more of the devices 104, 108 in the system 100 of FIG. 1, to facilitate a placeshifting session in conjunction with the recommendation process 200 of FIG. 2. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the placeshifting process 300 may be performed by different elements of the system 100, such as, for example, the server 102, the client device 104, the media device 108, and/or the database 120. It should be appreciated that the placeshifting process 300 may include any number of additional or alternative tasks, the tasks need not be performed in the illustrated order and/or the tasks may be performed concurrently, and/or the placeshifting process 300 may be incorporated into a more comprehensive procedure or process having additional functionality not described in detail herein. Moreover, one or more of the tasks shown and described in the context of FIG. 3 could be omitted from a practical embodiment of the placeshifting process 300 as long as the intended overall functionality remains intact.

In exemplary embodiments, the placeshifting process 300 begins by transmitting or otherwise providing a placeshifting request to a server and receiving or otherwise obtaining recommended communications configuration information from the server in response to the placeshifting request (tasks 302, 304). For example, as described above, a user of the client device 104 may manipulate a client application 105 to access the portal application 138 on the server 102 and transmit, submit, or otherwise provide, to the server 102, a request to establish a placeshifting session with the user's associated media device 108 over the network 106. In response to receiving the placeshifting request, the server 102 utilizes the identifier associated with the user's media device 108 to obtain recommended communications configuration information associated with the user's associated media device 108 from the database 120. In one or more exemplary embodiments, the server 102 transmits the recommended communications configuration information for the media device 108 to the client device 104 as a response to the placeshifting request. In alternative embodiments, the server 102 may respond to the placeshifting request by transmitting the recommended communications configuration information for the placeshifting session to the media device 108.

After receiving recommended communications configuration information from the server, the placeshifting process 300 continues by initiating a placeshifting session using the recommended communications configuration information (task 306). In exemplary embodiments, in response to receiving recommended communications configuration information associated with the media device 108 from the server 102, the client application 105 and/or media player application 107 automatically attempts to initiate the peer-to-peer connection 180 with the media device 108 using the recommended communications configuration information. For example, the server 102 may respond to the placeshifting request from the client device 104 with recommended communications configuration settings that include the destination IP address, MAC address, and/or the like associated with the recommended network interface 148 and/or physical communications layer for the media device 108 along with a recommended communications protocol and recommended communications protocol parameter values. In response, the client application 105 and/or media player application 107 automatically transmits or otherwise provides a request for the peer-to-peer connection 180 to that recommended destination IP address, MAC address, and/or the like of the media device 108 using the recommended communications protocol and the recommended communications protocol parameter values. In alternative embodiments, if the server 102 responds to the placeshifting request by providing recommended communications configuration information to the media device 108, the control module 146 may automatically operate the recommended network interface 148 to transmit or otherwise provide a request for the peer-to-peer connection 180 to the client device 104 using the recommended communications protocol and the recommended communications protocol parameters.

In the illustrated embodiment of FIG. 3, when the initial attempt at initiating a placeshifting session using an initial recommended communications configuration setting, the placeshifting process 300 continues by identifying or otherwise determining whether another recommended communications configuration setting is available and repeating the attempt to initiate a placeshifting session using a different recommended communications configuration setting (tasks 306, 308, 310). In this regard, if the server 102 responds to the placeshifting request by providing an ordered list of recommended communications configuration settings, the first or most highly recommended communications configuration setting from that list may be utilized for the initial attempt at establishing the peer-to-peer connection 180 between devices 104, 108. When the peer-to-peer connection 180 fails to be established using the most highly recommended communications configuration setting, the initiating device may select the second or next most highly recommended communications configuration setting from that list for use during a subsequent attempt at establishing the peer-to-peer connection 180 between devices 104, 108. For example, when the client application 105 and/or media player application 107 is unable to establish the peer-to-peer connection 180 using the most highly recommended communications configuration setting associated with the media device 108, the client application 105 and/or media player application 107 utilizes the next most highly recommended communications configuration setting associated with the media device 108 until the peer-to-peer connection 180 is successfully established or all of the recommended communications configuration settings associated with the media device 108 have been utilized.

When attempts at initiating a placeshifting session using the recommended communications configuration information provided by the server are unsuccessful, in exemplary embodiments, the placeshifting process 300 continues by identifying or otherwise determining an alternative communications configuration setting and initiating a placeshifting session using the alternative communications configuration setting (tasks 312, 314). For example, the client application 105 and/or media player application 107 may adjust, modify, or otherwise vary one or more aspects of the recommended communications configuration information associated with the media device 108 received from the server 102 (e.g., by adjusting the communications protocol, the values for one or more communications protocol parameters, and/or the like) to arrive at an alternative communications configuration setting. Thereafter, the client application 105 and/or media player application 107 utilizes the alternative communications configuration setting when attempting to establish the peer-to-peer connection 180. In this regard, in some embodiments, the client application 105 and/or media player application 107 may iteratively identify different alternative communications configuration settings and attempt to initiate a placeshifting session using the different alternative communications configuration settings until the peer-to-peer connection 180 with the media device 108 is successfully established. In this manner, the various possible combinations of communications protocols and parameter values may be exhaustively tested for the network interface(s) 148 of the media device 108 until arriving at a communications configuration setting that is effective at establishing the peer-to-peer connection 180. In an alternative embodiment, when attempts at initiating a placeshifting session using the recommended communications configuration information provided by the server 102 are unsuccessful, a communication configuration setting previously identified as likely to be unsuccessful (e.g., a communications configuration setting having a relatively low success metric value) may be recommended for use as alternative communications configuration setting.

Still referring to FIG. 3, after successfully establishing a peer-to-peer connection, the placeshifting process 300 continues by receiving media content via the peer-to-peer connection (task 316). In this regard, the media device 108 streams the desired media program to be placeshifted from the appropriate content source (e.g., the DVR 110, the receiver 142, the broadcast source 112, or another content source) to the client device 104 over the network 106 via the peer-to-peer connection 180. The client device 104 receives the streamed media program and presents or otherwise displays the streaming media program within media player 107 and/or client application 105.

In accordance with one or more embodiments, during the placeshifting session, one or more aspects of the communications configuration settings for the peer-to-peer connection 180 between the devices 104, 108 may be adjusted or otherwise modified to maintain the peer-to-peer connection 180. For example, if the media device 108 becomes decoupled from a physical communications layer (e.g., by removing the Ethernet cable from the Ethernet interface 148), the media device 108 may automatically adjust or otherwise modify the communications configuration settings for the peer-to-peer connection 180 to maintain the peer-to-peer connection 180, for example, by using a wireless interface 148 to stream the media program with a different communications protocol, a different MTU, a different data rate, and/or the like as needed to support maintaining the peer-to-peer connection 180 via the wireless communications layer. Similarly, if the client device 104 becomes decoupled from the network 106 via one physical communications layer (e.g., a cellular communications layer) while being coupled to the network 106 via another physical communications layer (e.g., an IEEE 802.11 wireless communications layer), the client application 105 and/or the media player 107 may automatically adjust or otherwise modify the communications configuration settings of the placeshifting session to maintain the peer-to-peer connection 180 via other physical communications layer. For example, the client device 104 may transfer the from being connected to the network 106 via a cellular or mobile telephony network to being coupled to the network 106 via an IEEE 802.11 wireless communications layer, with the client application 105 and/or the media player 107 automatically adjusting or otherwise modifying the communications configuration settings of the placeshifting session to maintain the peer-to-peer connection 180 via the IEEE 802.11 wireless communications layer.

In the illustrated embodiment of FIG. 3, the placeshifting process 300 identifies, detects, or otherwise determines when the placeshifting session has been terminated and transmits or otherwise provides the communications configuration settings that were most recently being utilized for the peer-to-peer connection to the server for influencing subsequently recommended communications configuration information (tasks 318, 320). For example, the client device 104 may terminate the peer-to-peer connection 180 after the streamed media program has been viewed (e.g., by the user of the client device 104 closing the client application 105 and/or the media player 107), or alternatively, the media device 108 may terminate the peer-to-peer connection 180 after the entire media program has been streamed to the client device 104. In response to the placeshifting session being terminated, the client device 104 and/or the media device 108 may automatically transmit or otherwise provide the most recent communications configuration settings associated with the peer-to-peer connection 180 to the server 102. In this regard, if the previously recommended communications configuration settings were unsuccessful at establishing the peer-to-peer connection 180 or were otherwise adjusted or modified during the placeshifting session, the client device 104 and/or the media device 108 notifies the server 102 of the updated communications configuration settings that were successful at establishing and/or maintaining the peer-to-peer connection 180. As described above in the context of FIG. 2, in response to receiving updated communications configuration settings from or otherwise associated with a device 104, 108, the server 102 may automatically update the recommended communications configuration information in the database 120 associated with that device 104, 108 to reflect the updated communications configuration settings. In this manner, the recommended communications configuration information associated with a particular device 104, 108 may be dynamically adjusted or otherwise augmented to reflect changes within the system 100 and increase the likelihood of successfully establishing subsequent placeshifting sessions with reduced latencies associated with creating the peer-to-peer connection 180.

FIG. 4 depicts an exemplary sequence 400 of communications within the system 100 of FIG. 1 in conjunction with the recommendation process 200 of FIG. 2 and the placeshifting process 300 of FIG. 3 in accordance with one or more exemplary embodiments. As described above in the context of the recommendation process 200 of FIG. 2, the sequence 400 begins with the server 102 obtaining 402 communications status information for the media device 108, performing 404 a communications configuration discovery procedure with the media device 108 using the communications status information for the media device 108, and storing 406 the communications status information and recommended communications configuration information for the media device 108 in the database 120. For example, when the media device 108 is powered on and/or becomes coupled to the network 106, the media device 108 automatically transmits or otherwise provides 402 its communications status information to an address on the network 106 associated with the server 102. As described above, the communications status information may include identification type and/or number of physical communications layers that the media device 108 is currently capable of communicating on, identification of the network interface(s) 148 of the media device 108 that are coupled to the network 106 via those physical communications layers, the performance characteristics and/or parameters for those physical communications layer(s) and/or network interface(s) 148, and the like.

Using the communications status information, the server 102 initiates 404 the communications configuration discovery procedure with the media device 108 to exhaustively test different combinations of communications protocols and communications protocol parameter values for the different network interface(s) 148 of the media device 108 to identify or otherwise determine the combinations of communications protocols, communications protocol parameter values and network interface(s) 148 that are most likely to be successful when used to establish a subsequent placeshifting session with the media device 108 (e.g., task 206). For example, for each different combination of communications configuration settings tested during the communications configuration discovery procedure, the server 102 may calculate or otherwise determine a respective success metric value (e.g., using a formula that represents a desired tradeoff between accuracy, reliability, throughput, and/or other performance characteristics) and identify the communications configuration setting(s) that achieve the highest success metric value(s) relative to the other possible communications configuration settings as recommended communications configuration setting(s) for the media device 108. In this regard, it should be appreciated that there are numerous different possible criteria that may be utilized to identify recommended communications configuration settings based on the needs or objectives of a particular embodiment, and the subject matter described herein is not intended to be limited to any particular manner of identifying recommended communications configuration settings.

The server 102 stores 406 information and/or data indicative of the recommended communications configuration setting(s) associated with the media device 108 in the database 120 (e.g., task 208). Depending on the embodiment, the server 102 may store only a single most highly recommended communications configuration setting (e.g., the communications configuration setting with the highest success metric value), an ordered list of a fixed number of the most highly recommended communications configuration settings (e.g., the subset of communications configuration settings with the highest success metric values) associated with the media device 108, or an ordered list of communications configuration settings having associated success metric values that are greater than a threshold value. Again, it should be appreciated that the number of recommended communications configuration settings to be stored and provided in response to placeshifting requests may vary based on the needs or objectives of a particular embodiment, and the subject matter described herein is not intended to be limited to any particular number of recommended communications configuration settings being stored and maintained in the database 120.

It should be noted that although FIG. 4 depicts the sequence 400 as involving the server 102 obtaining 402 communications status information for the media device 108, performing 404 a communications configuration discovery procedure with the media device 108, and storing 406 recommended communications configuration information for the media device 108 in the database 120, in practical embodiments, the sequence 400 may also include or otherwise involve the server 102 obtaining communications status information for the client device 104, performing a communications configuration discovery procedure with the client device 104, and storing recommended communications configuration information for the client device 104 in the database 120. For example, when the client device 104 is powered on and/or becomes coupled to the network 106, the client device 104 may automatically transmit or otherwise provide its communications status information to the network address associated with the server 102, which, in turn, initiates a communications configuration discovery procedure with the client device 104 to identify recommended communications configuration setting(s) associated with the client device 104 that are then stored in the database 120.

In the illustrated embodiment of FIG. 4, the server 102 receives 408 a placeshifting request from the client device 104 that indicates or otherwise identifies the media device 108 as the desired placeshifting device (e.g., based on the authenticated user of the client device 104 being associated with the media device 108), and in response, the server 102 obtains 410 the recommended communications configuration information associated with the media device 108 from the database 120 (e.g., tasks 210, 212). As described above in the context of FIG. 2, if the database 120 also maintains recommended communications configuration information associated with the requesting client device 104, the server 102 may obtain the recommended communications configuration information associated with the client device 104 from the database 120 and analyze the recommended communications configuration information for both devices 104, 108 to identify recommended communications configuration information for the requested placeshifting session. For example, in some embodiments, the server 102 may identify commonly recommended communications configuration setting(s) for both devices 104, 108 for use as the recommended communications configuration information for the requested placeshifting session. In other embodiments, the server 102 may combine or otherwise blend the communications configuration information for the devices 104, 108 to arrive at the recommended communications configuration information for the requested placeshifting session. For example, when the same communications protocol is recommended for both of the devices 104, 108 but with different communications protocol parameter values for the different devices 104, 108, the server 102 may identify the more restrictive value of the different communications protocol parameter values for a respective communications protocol parameter for use as the recommended value for that communications protocol parameter.

After obtaining the recommended communications configuration information for the placeshifting session, the server 102 transmits or otherwise provides 412 that recommended communications configuration information to the client device 104 for use when initiating 414 a placeshifting session with the media device 108. In this regard, the client device 104 may initiate creation of the peer-to-peer connection 180 by transmitting 414 a streaming request to the media device 108 using the most highly recommended communications configuration setting associated with the media device 108. If the most highly recommended communications configuration setting is not successful at establishing the peer-to-peer connection 180, the client device 104 may transmit another streaming request to the media device 108 using the next most highly recommended communications configuration setting, and so on, until all of the recommended communications configuration settings for the placeshifting session have been attempted. Thereafter, the client device 104 may adjust, modify, or otherwise vary one or more aspects of the communications configuration settings to obtain alternative communications configuration settings and transmit streaming requests for each of those alternative communications configuration settings until successfully establishing the peer-to-peer connection 180.

It should be noted that although FIG. 4 depicts the server 102 responding to the placeshifting request by providing the recommended communications configuration information to the client device 104 in response to the placeshifting request, in other embodiments, the server 102 may respond to the placeshifting request by transmitting or otherwise providing a streaming request to the media device 108 that includes the recommended communications configuration information for the placeshifting session and identifies the requesting client device 104 as the destination address for the placeshifting session. Thereafter, the media device 108 may respond to the streaming request by initiating creation of the peer-to-peer connection 180 with the client device 104 using the most highly recommended communications configuration setting for the placeshifting session, and if unsuccessful, attempt to establish the peer-to-peer connection 180 using another of the recommended communications configuration settings or an alternative communications configuration setting in a similar manner as described above.

Once the peer-to-peer connection 180 between devices 104, 108 is established, the client device 104 streams 416 a media program from the DVR 110, the receiver 142, or another content source accessible to the media device 108 via the peer-to-peer connection 180 (e.g., task 316). As described above, during the placeshifting session, the devices 104, 108 may modify or otherwise adjust the configuration settings for the peer-to-peer connection 180 to support or otherwise maintain the peer-to-peer connection 180 in response to changes on the network 106 and/or changes to one of the devices 104, 108 (e.g., changes in connectivity to the network 106, changes in the allocation of processing resources of a respective device 104, 108, and/or the like). In the illustrated embodiment of FIG. 4, after the placeshifting session is terminated, the client device 104 transmits or otherwise provides 418 the most recent communications configuration information for the peer-to-peer connection 180 (e.g., task 320) to the server 102 for updating 420 the recommended communications configuration information associated with the media device 108 and/or the client device 104 in the database 120 (e.g., tasks 216, 218). Again, it should be noted that although FIG. 4 depicts the client device 104 transmitting 418 the updated communications configuration setting for the peer-to-peer connection 180 to the server 102, in alternative embodiments, the media device 108 may transmit or otherwise provide the updated communications configuration setting for the peer-to-peer connection 180 to the server 102 in response to the placeshifting session being terminated.

Depending on the embodiment, the server 102 may add the updated communications configuration setting received from the client device 104 to the ordered list of recommended communications configuration settings for the media device 108 and/or the client device 104, replace the most highly recommended communications configuration setting for the media device 108 and/or the client device 104 with the updated communications configuration setting received from the client device 104, and/or move the updated communications configuration setting to a higher order in the list (e.g., when the updated communications configuration setting received from the client device 104 was already included in the list of recommended communications configuration settings). In this manner, the updated communications configuration setting received from the client device 104 influences the recommended communications configuration information provided by the server 102 in response to a subsequent placeshifting request associated with the media device 108 and/or the client device 104.

To briefly summarize, by virtue of the subject matter described herein, peer-to-peer connections between devices for a placeshifting session over a network may be reliably established and/or maintained with reduced latencies, which, in turn, may increase throughput and improve video resolution. For example, the devices do not need to perform an exhaustive discovery process or otherwise negotiate communications configuration settings before the peer-to-peer connection is established. Thus, the user experience is improved by reducing the delay associated with initiating the placeshifting session while also reducing the likelihood of buffering, packet and/or data loss, and other performance impairments that could otherwise be attributable to communications configuration settings that do not account for the performance of one or more of the devices, the physical communications layer(s) and/or networking interface(s), intermediary networking devices and/or the network, and the like.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to placeshifting, streaming media, networking, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of hardware, software, and/or firmware components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of placeshifting a media program from a first device to a second device over a network, the method comprising:
    receiving, by a server on the network, a request for a placeshifting session over the network with the first device from the second device;
    testing, by the server, a plurality of possible communications configuration settings for communicating with the first device over the network, the testing resulting in success metric values associated with the respective possible communications configuration settings of the plurality of possible communications configuration settings; and
    identifying, by the server, a recommended communications configuration setting from among the plurality of possible communications configuration settings based on the success metric values; and
    providing, by the server, the recommended communications configuration setting to one of the second device and the first device in response to the request.

2. The method of claim 1, wherein determining the recommended communications configuration setting comprises:
    determining first recommended communications configuration information for communicating with the first device over the network;
    determining second recommended communications configuration information for communicating with the second device over the network; and
    determining the recommended communications configuration setting based on the first recommended communications configuration information and the second recommended communications configuration information.

3. The method of claim 1, further comprising, after providing the recommended communications configuration setting:
    receiving updated communications configuration information for the placeshifting session from one of the second device and the first device;
    receiving, by the server, a second request for a second placeshifting session over the network with the first device; and
    providing, by the server, updated recommended communications configuration information for the second placeshifting session in response to the second request, wherein the updated recommended communications configuration information is influenced by the updated communications configuration information.

4. The method of claim 1, further comprising:
    receiving, by the server, updated communications configuration information for a peer-to-peer connection established between the second device and the first device for the placeshifting session after providing the recommended communications configuration setting;
    receiving, by the server, a second request for a second placeshifting session over the network with the first device; and
    providing, by the server, the updated communications configuration information in response to the second request.

5. The method of claim 1, further comprising storing the recommended communications configuration setting in association with the first device in a database coupled to the server, wherein providing the recommended communications configuration setting further comprises:
    obtaining the recommended communications configuration setting associated with the first device from the database in response to the request; and
    transmitting the recommended communications configuration setting to the one of the second device and the first device via the network.

6. The method of claim 5, wherein the one of the second device and the first device initiates a peer-to-peer connection over the network with the other of the second device and the first device using the recommended communications configuration setting.

7. The method of claim 6, further comprising:
    receiving, by the server, updated communications configuration information for the peer-to-peer connection;
    receiving, by the server, a second request for a second placeshifting session over the network with the first device from the second device;
    identifying, by the server, updated recommended communications configuration information for the second placeshifting session, wherein the updated recommended communications configuration information is influenced by the updated communications configuration information; and
    providing, by the server, the updated recommended communications configuration information to the one of the second device and the first device in response to the second request, wherein the one of the second device and the first device initiates a second peer-to-peer connection over the network with the other of the second device and the first device for the second placeshifting session using the updated recommended communications configuration information.

8. The method of claim 1, further comprising:
receiving, by the server, updated communications configuration information for the placeshifting session;
receiving, by the server, a second request for a second placeshifting session over the network with the first device; and
providing, by the server, the updated communications configuration information to one of the second device and the first device in response to the second request.

9. A non-transitory computer-readable medium having computer-executable instructions stored thereon that, when executed by a processing system, cause the processing system to perform the method of claim 1.

10. A system comprising:
a media device coupled to a network to stream a media program over the network to a client device; and
a server coupled to the network to receive a request for a placeshifting session with the media device from the client device, test a plurality of possible communications configuration settings for communicating with the media device or the client device over the network, identify a recommended communications configuration setting for the placeshifting session from among the plurality of possible communications configuration settings based on success metric values associated with the respective possible communications configuration settings of the plurality of possible communications configuration settings, and provide the recommended communications configuration setting to one of the client device and the media device in response to the request, wherein the one of the client device and the media device initiates a peer-to-peer connection over the network with the other of the client device and the media device using the recommended communications configuration setting, the media device streaming the media program to the client device via the peer-to-peer connection.

11. The system of claim 10, further comprising a database to store the recommended communications configuration setting, wherein the server is configured to:
receive updated communications configuration information for the peer-to-peer connection;
update the recommended communications configuration setting in the database in a manner that is influenced by the updated communications configuration information, resulting in updated recommended communications configuration information; and
provide the updated communications configuration information in response to a second request for a second placeshifting session with the media device.

12. The system of claim 10, wherein the recommended communications configuration setting comprises a recommended communications configuration setting for communicating with the media device over the network.

13. The system of claim 12, further comprising a database to store the recommended communications configuration setting, wherein the server is coupled to the database to obtain the recommended communications configuration setting from the database in response to the request and provide the recommended communications configuration setting to the one of the client device and the media device.

14. The system of claim 10, further comprising a database to store first recommended communications configuration information associated with the media device and second recommended communications configuration information associated with the client device, wherein the server is coupled to the database to obtain the first recommended communications configuration information and the second recommended communications configuration information from the database and determine the recommended communications configuration setting based on the first recommended communications configuration information and the second recommended communications configuration information.

15. The system of claim 10, wherein the server receives updated communications configuration information for the peer-to-peer connection from one of the client device and the media device and provides the updated communications configuration information in response to a second request for a second placeshifting session with the media device.

16. A media device comprising:
a network interface configured to support communications via a network; and
a control module coupled to the network interface, wherein the control module and the network interface are cooperatively configured to test a plurality of possible communications configuration settings for the network interface, receive a streaming request including a recommended communications configuration setting identified from among the plurality of possible communications configuration settings based on success metric values associated with the respective possible communications configuration settings of the plurality of possible communications configuration settings based on the testing, and establish a peer-to-peer connection with a client device over the network using the recommended communications configuration setting.

17. The media device of claim 16, wherein the control module is coupled to a content source to stream a media program from the content source to the client device via the peer-to-peer connection in response to establishing the peer-to-peer connection.

* * * * *